United States Patent
Roth

(10) Patent No.: US 7,174,831 B2
(45) Date of Patent: Feb. 13, 2007

(54) BALER PLUNGER DRIVE LOAD MEASUREMENT PIN OFFSET FROM EITHER CONNECTING ROD CENTER LINE OR HORIZONTAL MID-PLANE OF BALING CHAMBER

(75) Inventor: Darin Ledru Roth, Ottumwa, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/180,798

(22) Filed: Jul. 13, 2005

(65) Prior Publication Data

US 2005/0241500 A1    Nov. 3, 2005

Related U.S. Application Data

(62) Division of application No. 10/665,218, filed on Sep. 17, 2003.

(51) Int. Cl.
*B30B 15/00* (2006.01)

(52) U.S. Cl. ................ 100/99; 100/192; 100/295; 74/579 R; 403/294

(58) Field of Classification Search ........... 100/43, 100/48, 99, 50, 191, 192, 230, 280, 295; 56/341; 29/888.09; 74/579 R–579 E; 403/292, 403/294

See application file for complete search history.

(56) References Cited

U.S. PATENT DOCUMENTS

| | | | | |
|---|---|---|---|---|
| 4,624,180 A | * | 11/1986 | Strosser ................ | 100/41 |
| 4,627,341 A | * | 12/1986 | Sudbrack et al. ........ | 100/41 |
| 5,123,338 A | * | 6/1992 | Mathis .................. | 100/43 |
| 5,253,570 A | * | 10/1993 | Goeckner ................ | 100/41 |
| 5,950,410 A | * | 9/1999 | O'Brien et al. .......... | 56/341 |
| 6,457,405 B1 | * | 10/2002 | Lippens et al. .......... | 100/99 |

* cited by examiner

*Primary Examiner*—Derris H. Banks
*Assistant Examiner*—Jimmy T. Nguyen

(57) ABSTRACT

A baler for making large parallelepiped bales includes a plunger drive and plunger arrangement wherein one or more load pins are located offset vertically from a centerline of a connecting rod or a mid-plane of the baling chamber. Such an arrangement permits load pins having the same range of measuring capacity to be used with balers of different sizes, with the amount of offset being changed for balers of different sizes. In one arrangement, load pins are offset vertically from the mid-plane of the plunger a distance sufficient to make it possible to measure differences in top-to-bottom reaction forces imposed on the plunger.

2 Claims, 4 Drawing Sheets

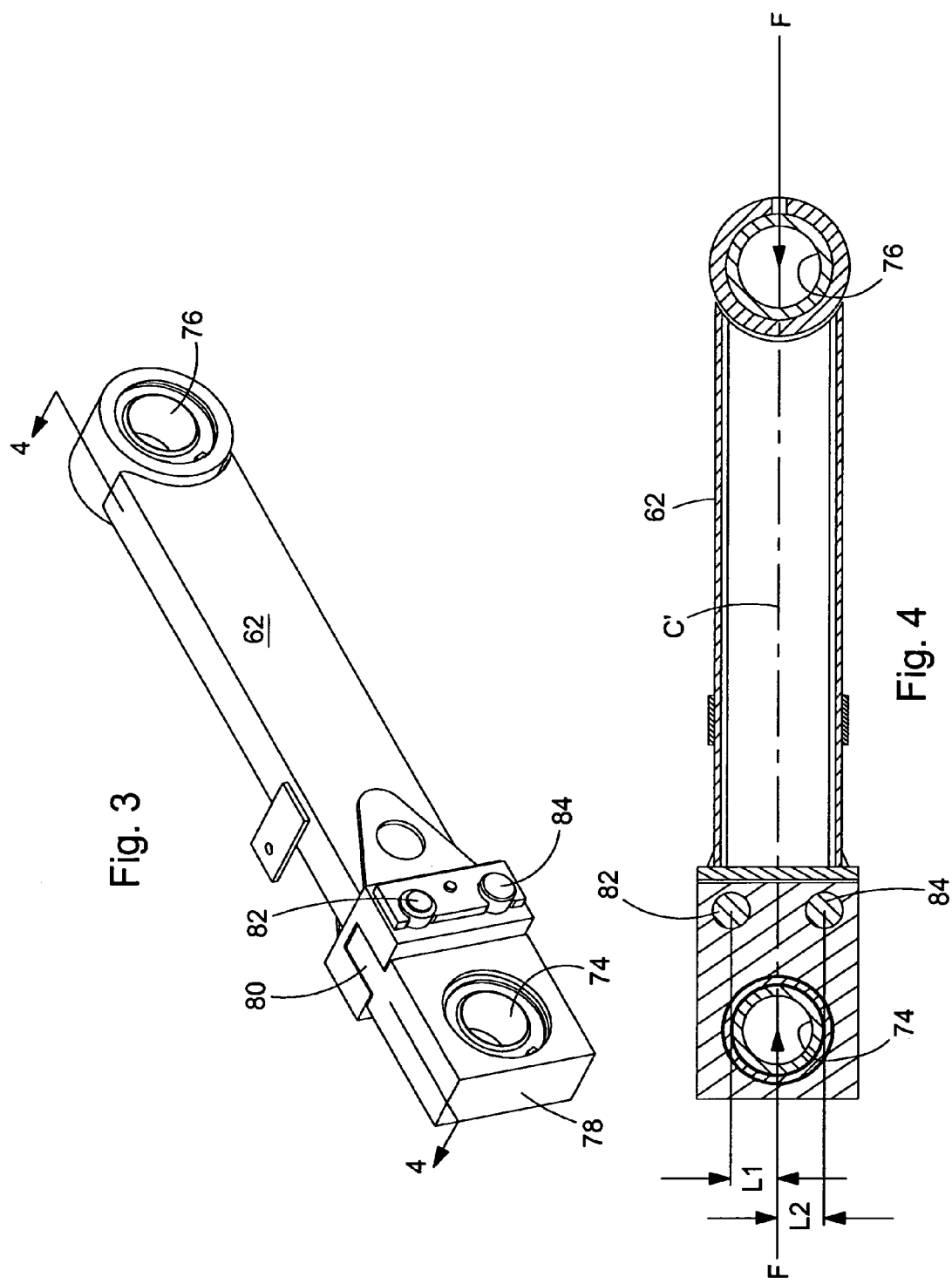

US 7,174,831 B2

BALER PLUNGER DRIVE LOAD MEASUREMENT PIN OFFSET FROM EITHER CONNECTING ROD CENTER LINE OR HORIZONTAL MID-PLANE OF BALING CHAMBER

This application is a divisional of application Ser. No. 10/665,218, filed 17 Sep. 2003.

FIELD OF THE INVENTION

The present invention relates to balers for making large parallelepiped bales, and more specifically, relates to devices for measuring the load imposed by the baler plunger drive on a bale being formed so as to obtain a control signal used in forming uniform density bales.

BACKGROUND OF THE INVENTION

Balers for forming large parallelepiped bales are often equipped with a pre-compression chamber in the form of a curved chute or duct in which crop material is accumulated until it reaches a predetermined density whereupon a stuffer arrangement is actuated to lift the charge of crop material into the baling chamber at a location just behind the baler plunger. Once the charge of crop material is in the baling chamber, the plunger operates to compact the charge against previously compacted crop material located in the baling chamber and acting against the restriction of adjustable side panels which adjust the cross section of the baler to restrict the movement of the crop material so as to cause a bale having a desired density to be formed. In order to ensure that the formed bale is of a uniform density, it is a known practice to measure the force required to compact the crop material, this force being indicative of the density. Because the density of the charge of crop material placed in the baling chamber may differ from side-to-side, it is known to take force measurements in each of a pair of laterally spaced connecting rods extending between the plunger driver and the plunger. A signal is generated using these measurements to notify an operator of the need to cause the baler to be displaced transversely one way or the other relative to a crop material windrow in order to cause additional crop material to enter the baler on that side which has the lower measurement of compaction force.

U.S. Pat. No. 4,627,341, dated 9 Dec. 1986, and U.S. Pat. No. 5,253,570, dated 19 Oct. 1993, disclose respective examples of load sensors incorporated in transversely spaced connecting rods of the baler plunger drive for the purpose of measuring the load imposed on a bale being formed and generating signals used in a control system for aiding an operator in forming uniform density bales. These load sensing devices are located so as to be at a central horizontal plane through the connecting means when the plunger is fully-extended to the rear during compaction of the charge of crop.

Large square balers of different sizes experience plunger loads proportional to the lateral cross-sectional area contained between the opposite side walls of the baling chamber or bale case. Data resolution is lost if a more robust load pin is used than is required for the loads that occur. Consequently, a manufacturer that makes various sizes of balers is required to keep an inventory of load pins of various sizes, which increases cost.

SUMMARY OF THE INVENTION

According to the present invention, there is provided a novel plunger load sensing arrangement.

An object of the invention is to provide a plunger load sensing arrangement which makes it possible to use one size of load sensing pin for various baler sizes.

A more specific object of the invention is to provide a load sensing pin arrangement including a plunger drive connecting rod having a separable end coupled to the remainder of the connecting rod by a pair of pins, with one of the pins being a load pin offset from a line of centers extending through plain spherical ball bearings provided at opposite ends of the connecting rod.

According to a second embodiment of the invention, it is an object to provide a load pin arrangement used to secure a connecting rod mounting plate to each of laterally spaced locations on the plunger wherein the load pin or pins are offset vertically from a central horizontal plane passing through the plunger.

These and other objects of the invention will become apparent from a reading of the ensuing description together with the appended drawings.

BRIEF DESCRIPTION OF THE DRAWINGS

FIG. 3 is an enlarged perspective view of one of the plunger drive connecting rods shown in FIG. 2.

FIG. 4 is a longitudinal sectional view taken along line 4—4 of FIG. 3.

DESCRIPTION OF THE PREFERRED EMBODIMENT

Figure 1:
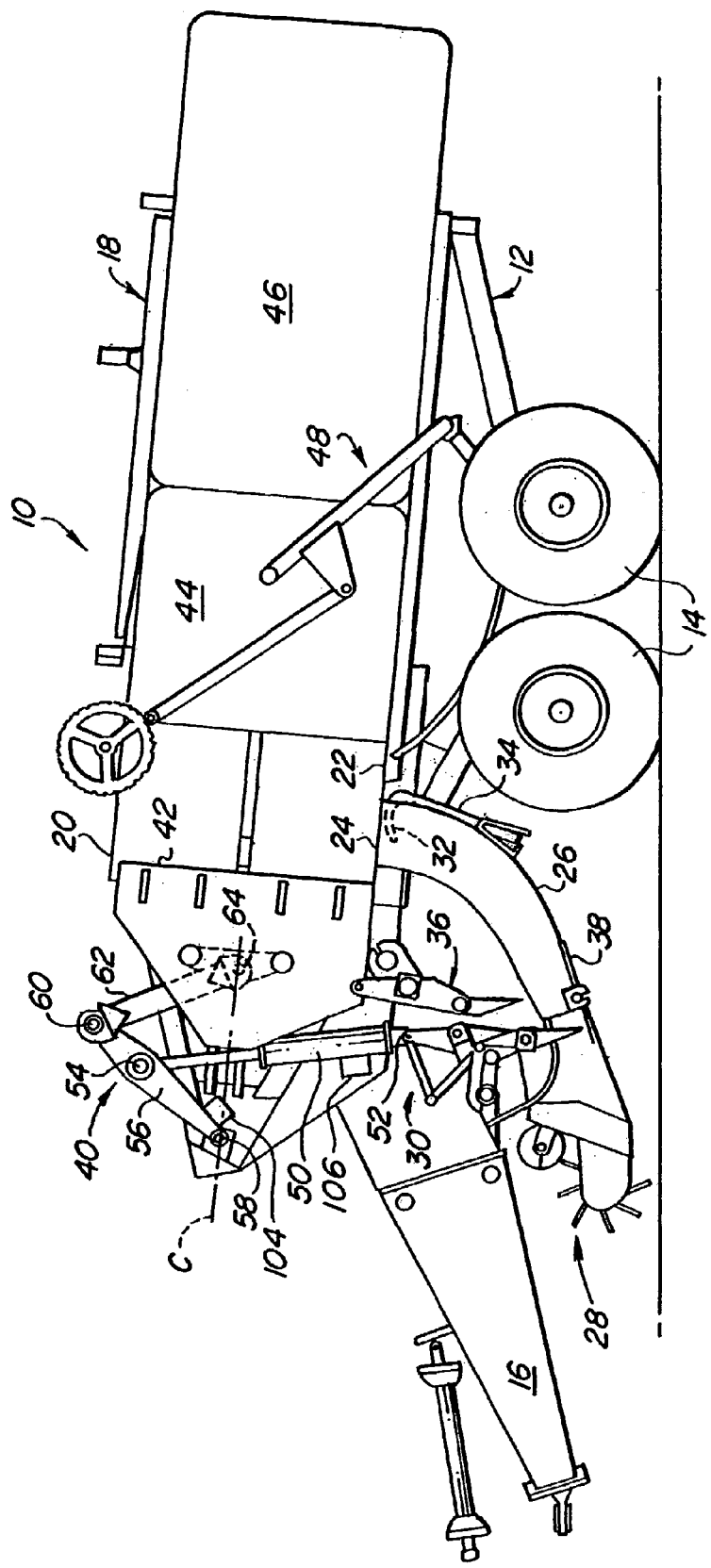
FIG. 1 is a schematic, left side elevational view of a baler for making large parallelepiped bales and with which the present invention is particularly adapted for use.

Referring now to FIG. 1, there is shown a baler 10 for forming large parallelepiped bales and including a main frame 12 supported on a tandem set of ground wheels 14. A draft tongue 16 projects forwardly from the front of the frame 12 and is adapted for attachment to a towing vehicle, such as an agricultural tractor, not shown. A baling chamber 18 includes parallel top and bottom walls 20 and 22, respectively and opposite, parallel side walls, which are all arranged so as to have a square or rectangular cross section. The bottom wall 22 is provided with a crop inlet 24 to which is coupled the upper end of a pre-compression chamber 26 in the form of a duct that curves upwardly and rearwardly from a crop pick-up 28. Located in the region between the pick-up 28 and the pre-compression chamber 26 is a feeder fork arrangement 30 that operates to positively move crop into the forward end of the chamber 26. Transversely spaced tines 32 of a pivotally mounted crop blocking fork 34 are selectively movable between a crop retaining position, as shown, wherein they extend through over an upper edge of a back wall of the pre-compression chamber 26 at a location adjacent the baling chamber inlet 24, and a rearwardly pivoted crop release position, for permitting an accumulated charge of crop to be moved into the baling chamber 18 through operation of a stuffing fork 36 having transversely spaced forks that move down through slots provided in a front wall of the pre-compression chamber 26, and then sweep upwardly through the chamber 26 to move the charge of crop into the baling chamber 18. Appropriate actuators, not shown, are associated with the blocking fork 34 and stuffing fork 36, and are associated with controls that are sequenced to effect retraction of the blocking fork 34 and then operation of the stuffer fork 36 once the charge of crop has reached a pre-selected density as determined by a spring loaded, density sensing door 38.

Once the charge of crop has been moved into the baling chamber 18, it is moved rearwardly by operation of a plunger drive 40 acting on a plunger 42 which compresses the charge of crop against a partially formed bale 44 and a completely formed bale 46 which has already been bound together by several transversely spaced loops of twine that have been placed there by operation of a twine tying arrangement, of which only a needle yoke 48 is shown, which is pivotally mounted for delivering twine through the baling chamber when a forming bale 44 reaches a predetermined length.

Figure 2:
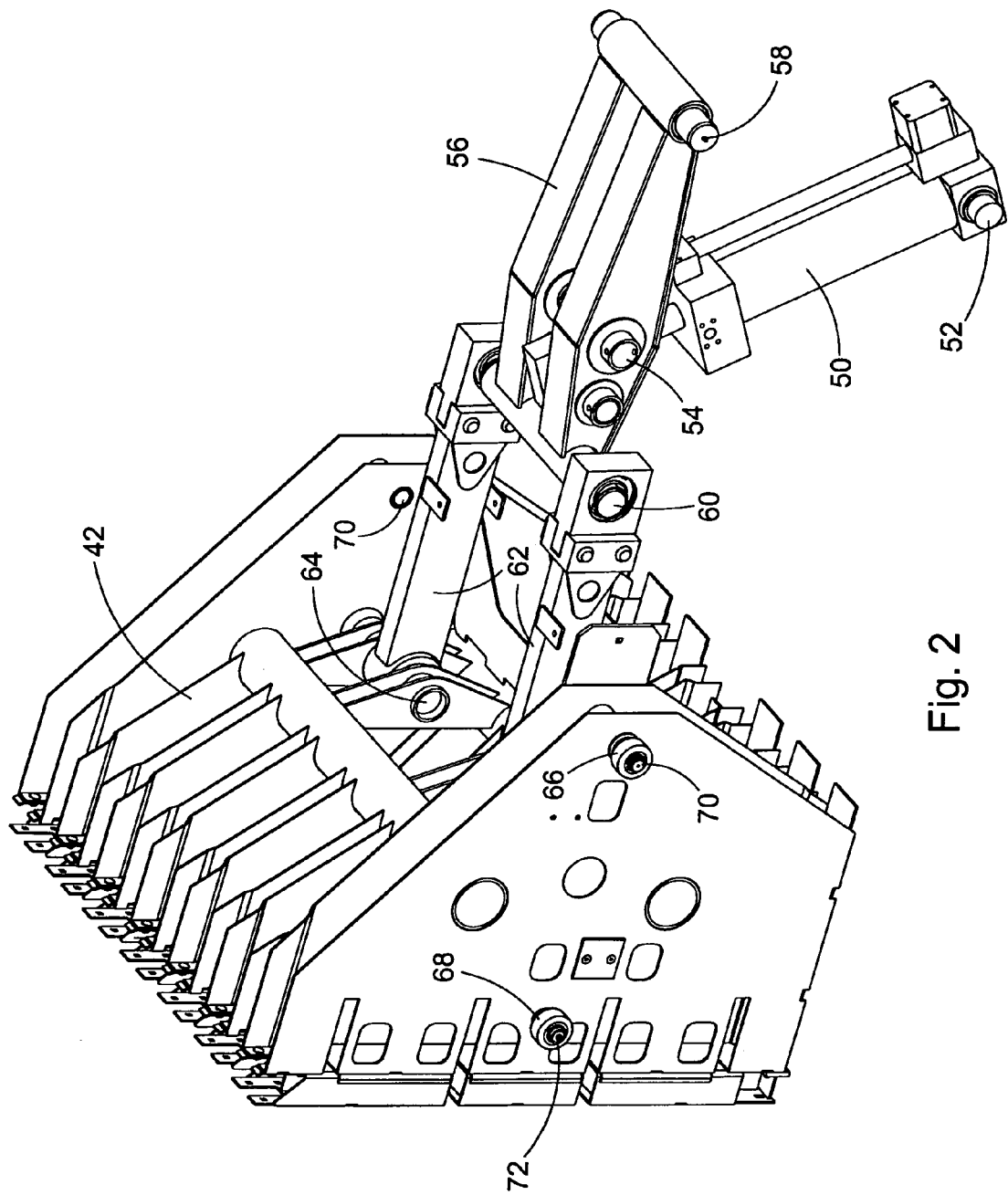
FIG. 2 is a right front perspective view of the plunger and plunger drive arrangement equipped with the load sensing pins arranged according to a first embodiment of the present invention.

Referring now also to FIG. 2, it can be seen that the plunger drive 40 includes an extensible and retractable hydraulic drive cylinder 50 having its cylinder end anchored to the frame 12 by a coupling pin 52, and having its rod end pivotally coupled, as at pin 54, to a crank arm 56. The crank arm 56 is mounted for oscillating about a horizontal transverse axis defined by a pin 58 coupling the forward end of the crank arm 56 to the frame 12. The rear end of the crank arm 56 is pivotally coupled, as by a coupling pin 60, to the forward ends of a parallel pair of transversely spaced connecting rods 62 having their rear ends pivotally coupled to the plunger 42 by respective coupling pins 64. The hydraulic drive cylinder 50 is shown in its retracted position in FIG. 2, this position corresponding to that which it occupies when the plunger 42 is fully extended to the rear within the baling chamber 18. Movement of the plunger 42 between its fully retracted position, shown in FIG. 1, and its fully extended position, is guided by front and rear pairs of rollers 66 and 68, respectively mounted for rotation about front and rear pairs of pins 70 and 72 fixed to opposite side walls of the plunger 42. It is significant to note that a line of centers C' extends between the centers of the pins 60 and 64 of each of the connecting rods 62.

Referring now also to FIGS. 3 and 4, it can be seen that front and rear ends of each connecting rod 62 are respectively provided with transverse bores in which are located identical front and rear plain spherical-ball bearings 74 and 76, with a center line. Each connecting rod 62 includes a separate forward end section 78 defined by a bar of rectangular cross section in which is located the bore containing the front bearing 74. The connecting rod forward end section 78 includes a reduced-width tongue 80 located between opposite sides of a bifurcated forward end of the remaining portion of the connecting rod 62. The end section 78 is held in place by a force-sensing load pin 82 and a further pin 84, with the pins 82 and 84 respectively being located offset above and below the center line C'.

Referring to FIG. 4, there is shown a force analysis of one of the connecting rods 62. Since the plain spherical-ball bearings 74 and 76 are located at each end of the connecting rod 62, the connecting rod 62 will not endure any bending load, but only tension or compression forces F. The load path will always be through the centers of each ball of the bearings 74 and 76. The distance from the load path to the load pin 82 is L1, while the distance between the connecting pin 84 and the load path is L2. Consequently, the ratio of distances between the load path and the pins 82 and 84 (L1/L2) will determine the amount of force generated in each pin. If L1>L2, the force through the load pin 82 will be smaller, and if L1<L2, the force through the load pin 82 will be greater. Accordingly, the connecting rod 62 can be designed to use the full load range of an already existing load pin, thereby maximizing the electronic sensitivity of the load pin.

Figure 5:
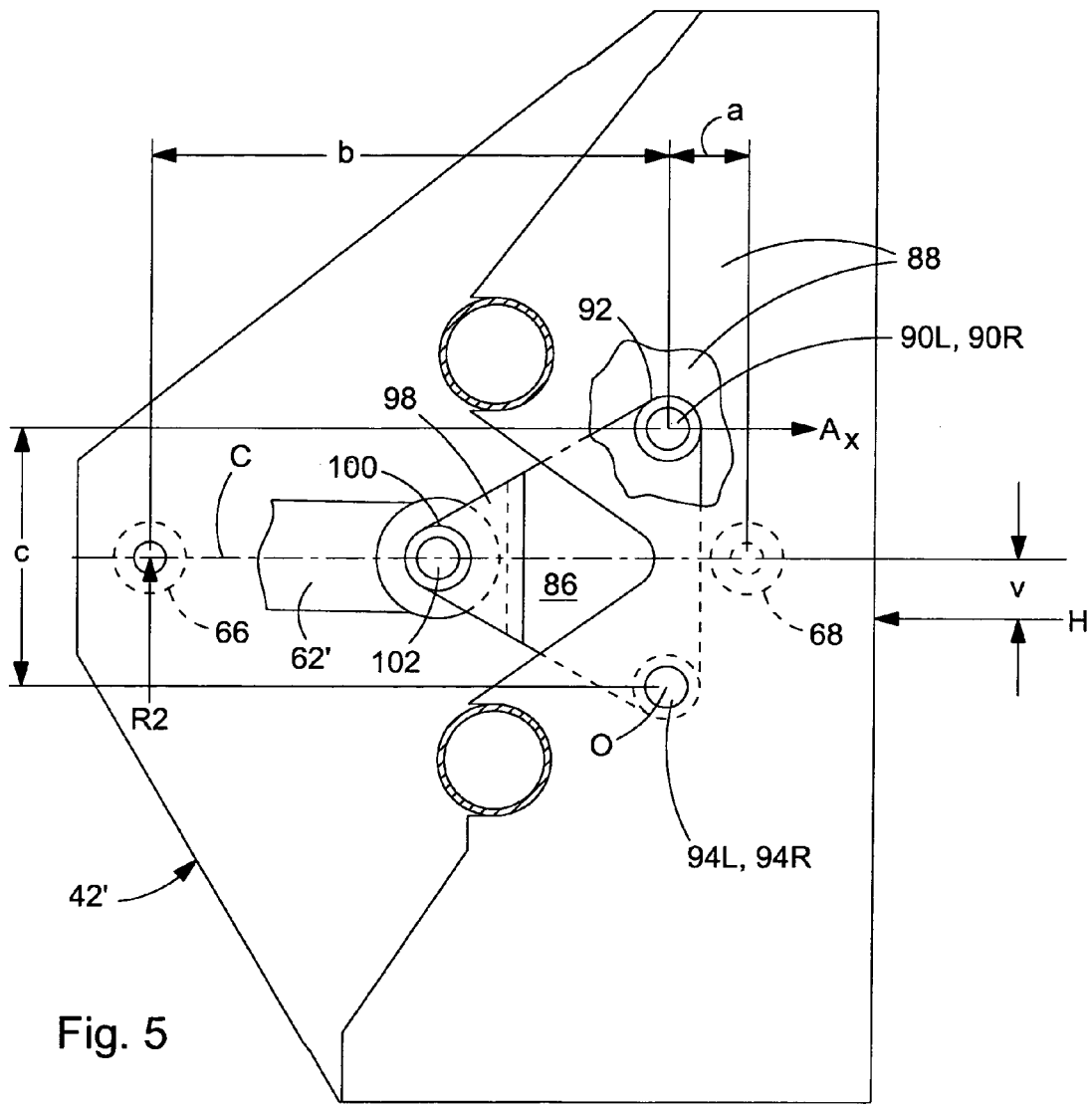
FIG. 5 is a left side elevational view of an alternate embodiment of the invention wherein plunger includes separate triangular plates each mounted to the remainder of the plunger by a load sensing pin and a coupling pin, and to the rear end of a respective connecting rod by a further pin.

Referring now to FIG. 5, there is shown a second embodiment of the invention. Specifically, illustrated is a plunger 42' including right- and left-hand identical, transversely spaced plates, with only the left-hand plate 86 being visible. The plate 86 is here shown in the form of an equilateral triangle, with two corners being disposed in vertical alignment with each other and equally offset vertically on opposite sides of the central plane C, and with the remaining corner being located ahead of the other two corners and centered on the central plane C. The right- and left-hand triangular plates are respectively received between right- and left-hand pairs of plate-like, vertical strengthening ribs of the plunger 42', with only the left-hand pair of ribs 88 being visible. A left-hand load pin 90L extends through aligned holes provided in the pair of ribs 88 and a bushing 92 forming an upper rear corner of the triangular plate 86, with it to be understood that a right-hand load pin 90R (not visible) is similarly provided for securing the upper rear corner of the right-hand triangular plate to the right-hand pair of plate-like strengthening ribs of the plunger 42'. Similarly, a left-hand coupling pin 94L extends through aligned holes in the pair of ribs 88 and in a bushing 96 forming a lower rear corner of the triangular plate 86. Similarly, a right-hand coupling pin 94R (not visible) extends through aligned holes in the right-hand pair of strengthening ribs and a bushing defining a lower rear corner of the right-hand triangular plate. The rear ends of a pair of connecting rods 62' are respectively coupled to the forward corners of the right- and left-hand triangular plates, with only the coupling of a left-hand connecting rod 62' to the left-hand plate 86 being shown. Specifically, a front section of the triangular plate 86 is bifurcated so as to define a front corner comprising parallel, transversely spaced sides 98 which are each provided with a bushing 100, the bushings 100 cooperating to define the forward corner of the plate 86. The rear end of the left-hand coupling rod 62' is received between the spaced sides 98 of the front section of the plate 86 and secured thereto by a coupling pin 102, which is centered on the plane C. The connecting rods 62' carry the spherical-ball bearings 74 and 76, respectively, at their front and rear ends.

It is here noted that whether or not the plates coupling the connecting rods to the plunger 42' are triangular is immaterial, but what is material is the locations of the load pins and coupling pins since the load computations are easier if these locations are similar to the triangular pattern shown. Like the connecting rods 62 of the first embodiment, the front ends of the connecting rods 62' are pivotally coupled to the rear end of the crank arm 56 by the pin 60.

Figure 6:
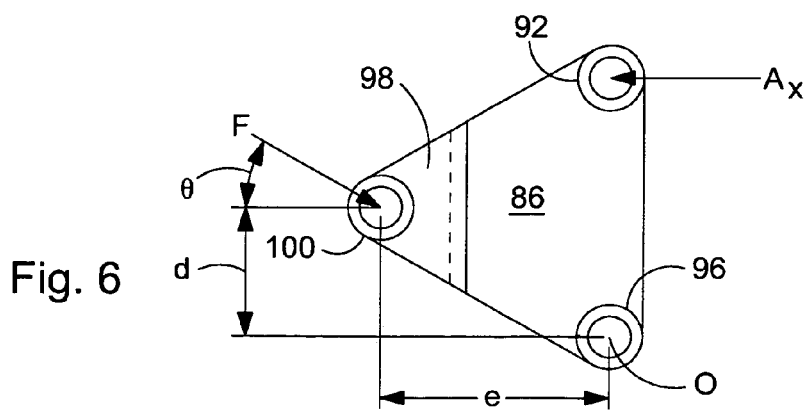
FIG. 6 is a side view of the triangular plate shown in FIG. 5, with the connecting rod input and reactive plunger drive forces being indicated.

Referring now to FIG. 6, there is shown the left-hand triangular plate 86 showing the forces imposed thereon during a compaction stroke, with it to be understood that similar forces will be imposed on the right-hand triangular plate.

The following calculations, together with the free-body forces illustrated in FIGS. 5 and 6, demonstrate a concept to determine both side-to-side and vertical offset loading on the plunger of a baler while using only two load pins. There are four sensors, namely, a crank angle position sensor 104, which determines the position of the plunger 42 as a function of the angular relationship between the crank arm 56 and the center plane C, a cylinder pressure sensor 106 coupled to the plunger drive cylinder 50, and the right and left load pins 90R and 90L, respectively. The additional top-to-bottom offset loading information may be used to adjust stuffer speed and stroke as well as the pre-compression chamber density. All of these machine settings may be used to make a more uniform flake and thus, a more uniform bale.

The following identifies the various terms used in the calculations:

F=connecting rod force
H=reacting force resisting plunger movement
a=longitudinal distance between load pins and rear plunger roller
b=longitudinal distance between load pins and front plunger roller
c=vertical distance between coupling pins and load pins
d=vertical distance from connecting rod pin to lower plunger pin
e=horizontal distance from pinned connections between triangular plates and plunger
Axl=left hand reaction at point A in the longitudinal direction
Axr=right hand reaction at point A in the longitudinal direction
θ=crank angle
R2$l$=reaction at plunger's left, front bearing
R2$r$=reaction at plunger's right, front bearing The equations then are:

H=F (cos θ), with F being known with the pressure sensor 106 coupled to the drive cylinder 50 and with θ being known from the sensor 104. For the purposes of the below calculation, the case is that where a=0, but it does not have to be. Further, assume the plunger 42' and triangular attaching plates 86 to be infinitely rigid and not experiencing rotational or translational acceleration. As shown in FIG. 5, the sum of the moments about point O on the plunger 42' must equal zero. Consequently, Axl(c)+Axr(c)+R2$l$(b)+R2$r$(b)=H(c/2−v), with it being noted that the front and rear pairs of plunger rollers 66 and 68 counter any moment induced on the plunger through an offset in top-to-bottom loading. The goal is to determine the sum of the moments about point O on the attaching plate assemblies 86. As applied to FIG. 6, the equation for doing this is: F(cos θ)(d)−F(sin θ)(e)=Axl(c)+Axr(c) where Axl and Axr are actual load pin readings. Left-to-right, or lateral, offset loading is easily calculated in the following equation: L-to-R offset=Axl−Axr/(Axl+Axr). Top-to-bottom, or vertical, offset loading is the difference between the expected Ax pin load and the actual pin readings. Specifically, Top-to-Bottom Offset=[F(cos θ)−Axl−Axr]/F(cos θ). A positive value indicates the reactive load H resisting plunger movement is below center while a negative value indicates the load H is acting above the center of the plunger.

Thus, it will be appreciated that the plunger/connecting rod/connecting plate arrangement of the second embodiment has the same ability to measure side-to-side load differences on the plunger as does the plunger/connecting rod arrangement of the first embodiment, and additionally has the ability to measure top-to-bottom load differences.

Having described the preferred embodiment, it will become apparent that various modifications can be made without departing from the scope of the invention as defined in the accompanying claims.

The invention claimed is:

1. A baler plunger comprising: first and second transversely spaced connecting rod mounting plates located along a horizontal plane passing centrally through said plunger; said mounting plates each being releasably mounted to a remaining portion of said plunger solely by first and second pins, the first and second pins are positioned offset to opposite sides of said horizontal plane; and at least one of said first and second pins being a load sensing pin, wherein said mounting plates are each triangular; said first and second pins being located in vertical alignment with each other and respectively located in first and second corners of an associated one of said mounting plates; and a third corner of each plate being adapted for coupling to an end of a connector rod.

2. The baler plunger, as defined in claim 1 wherein said first and second pins are spaced equally from said horizontal plane.

* * * * *